T. J. POWERS.

Primers for Cartridges.

No. 6,022.

Reissued Aug. 18, 1874.

Witnesses:

W. H. Dodge

E. A. Dodge,

Inventor:

T. J. Powers by Dodge & Son

Attys.

UNITED STATES PATENT OFFICE.

TIMOTHY J. POWERS, OF NEW YORK, N. Y.

IMPROVEMENT IN PRIMERS FOR CARTRIDGES.

Specification forming part of Letters Patent No. 115,892, dated June 13, 1871; reissue No. 6,022, dated August 18, 1874; application filed March 7, 1874.

*To all whom it may concern:*

Be it known that I, TIMOTHY J. POWERS, of the city, county, and State of New York, have invented new and useful Improvements in Cartridge-Cases for Breech-Loading Guns, and Primers for the same, of which the following is a specification, reference being had to the accompanying drawing, forming part thereof, in which—

Figure 3:
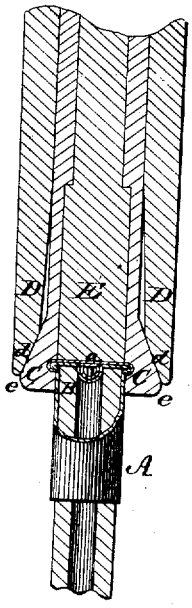
Figure 4:
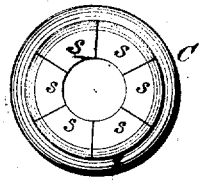
Figure 1:
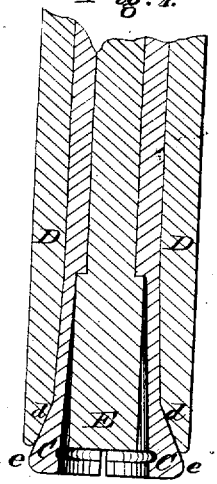
Figure 6:
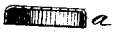
Figure 5:
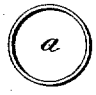
Figure 2:
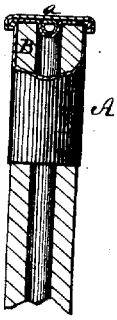
Figure 9:
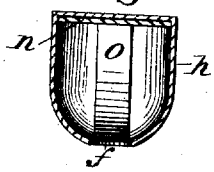
Figure 7:
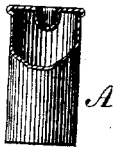
Figure 8:
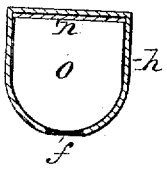

Figure 1 is a central sectional view of a set of tools that may be used in making the butt of my improved cartridge-case, which is shown in a position ready to receive the butt, for the purpose of crimping on a metallic gas-check. Fig. 2 is a view, partly in section, of a cartridge-case with a metallic gas-check placed upon the butt ready to be introduced into and operated on by the tools, Fig. 1. Fig. 3 is a similar view of the same tools and cartridge-case after the spring-die has been closed down upon the butt of the case, and the gas-check has been thereby fastened on. Fig. 4 is a face view of the end of said tools when in the position shown in Fig. 3. Fig. 5 is a circular piece of metal designed for a gas-check on the butt of the cartridge-case. Fig. 6 is a central sectional view of the same piece of metal cupped up preparatory to being placed upon the butt of the cartridge-case. Fig. 7 is a view, partly in section, of a cartridge-case ready to receive the gas-check, Fig. 6. Figs. 8 and 9 are enlarged views of the primer detached.

The nature of my invention consists in applying and fastening a gas-check formed of a thin plate of metal to the exterior surface of the butt of a cartridge-case having an annular projecting base, and that has a perforation made through the butt for the purpose of effecting a center priming. When the butt of a cartridge-case is perforated for the purpose of priming it, which is usually done when the priming is placed in the center of the butt, there is always a liability to an escape of gas on firing the cartridge in a gun. To obviate this liability, I apply a gas-check to the external surface of the butt in the following manner:

I cut from a thin sheet of copper or other suitable metal a disk, Fig. 5, a little larger in diameter than the cartridge-butt. This disk is first, by a proper punch and die, bent into the shape shown in Fig. 6. It is then placed upon the butt of a cartridge-case having an annular projecting base, Fig. 7, as seen in Fig. 2, A. In this figure, A is the cartridge-case, made and center-primed in the ordinary manner. B is a supporting-punch inserted into the case, and *a* the gas-check. The case, punch, and gas-check are to be carried up into the sectional spring-die C until the gas-check is brought into contact with the lower end of the central mandrel E. This spring-die C is divided at the lower end into several sections, *s*, the divisions extending up far enough to permit each section to act as a spring, being bent a little outward, thus separating the sections, so as to admit the butt of the case with its gas-check *a*. An annular groove, *c*, is made in the inner face of the die, and the butt of the case is inserted just far enough to bring the projecting base of the butt of the case into the plane of this groove. The socket D is then forced downward, the flaring mouth *d* acting against the inclined projection *e* of the end of the die C, forcing the sections inward, and bringing them into the position shown in Fig. 3, thus bending the rim of the gas-check *a* over the projecting base *g* of the butt of the case, and securely and neatly fastening it on. The socket D is then forced upward, the sections C separate, and the case is removed with the gas-check applied and securely attached. The primer which I use for the cartridge consists of an ordinary gun-cap, which has a metal anvil set in it, and secured therein by compressing the mouth or open end of the cap, as shown in Figs. 8 and 9, where the primer is shown detached and enlarged, for the purpose of showing it more plainly. In these figures, *h* represents the cap, which has a layer, *n*, of fulminate over its interior base, as usual. Within the cap *h*, I insert edgewise a metallic disk or anvil, *o*, which is made by being punched from sheet metal, of the required size and form, and to hold this anvil in, the mouth of cap is compressed by means of a suitable tool, so as to leave a small central opening, *f*, as shown in Figs. 8 and 9, for the fire to escape when the primer is exploded.

By these means I produce an efficient primer, and the rounded or spherical end is admirably adapted to fit the pocket or cavity in the head of the shell, which is in like manner rounded or hemispherical at its bottom, it being less liable to fracture the metal in forming it thus than when made with more abrupt angles.

I am aware that cartridge-cases have been made having two thicknesses of metal in the butt; but in all such cartridge-cases known to me either a metal cup is inserted within the case proper, for the purposes of an angle or to re-enforce the butt, or the closed end of the case, made with an annular projection around the base, is inserted into a regularly-formed second case, differing from the first, if at all, only in being shorter, and having a flanged or projecting base. I do not claim either of these forms of double headed cartridge-cases; but What I do claim as my invention, and desire to secure by Letters Patent, is—

A primer consisting of a percussion-cap, having an anvil composed of a piece of metal inserted edgewise therein, and secured in place by compressing or bending in the edge of the cap, substantially as described.

TIMOTHY J. POWERS.

Witnesses:
ALFRED A. FURMAN,
ORLANDO P. SMITH.